United States Patent [19]
Wall

[11] 3,964,441
[45] June 22, 1976

[54] CANE AND LEASH WINDING ASSEMBLY
[76] Inventor: Thomas P. Wall, 1551 30th Ave. West, Seattle, Wash. 98199
[22] Filed: Apr. 2, 1975
[21] Appl. No.: 564,330

[52] U.S. Cl. ............................................. 119/109
[51] Int. Cl.² ...................................... A01K 27/00
[58] Field of Search..................... 119/109, 111, 124

[56] References Cited
UNITED STATES PATENTS
| | | | |
|---|---|---|---|
| 2,929,358 | 3/1960 | Morrow | 119/109 |
| 3,244,149 | 4/1966 | Bosko et al. | 119/109 X |
| 3,693,596 | 9/1972 | Croce et al. | 119/109 |

Primary Examiner—Hugh R. Chamblee
Attorney, Agent, or Firm—Seed, Berry, Vernon & Baynham

[57] ABSTRACT

A cane has a self-winding reel for a leash with a snap hook at its free end which is seated in an open position at the bottom of the cane when the leash is retracted. Means are provided for limiting the amount of leash released from the reel.

7 Claims, 3 Drawing Figures

CANE AND LEASH WINDING ASSEMBLY

FIELD OF THE INVENTION

The present invention relates to a combination cane and dog leash assembly and, more particularly, to such an assembly in which the leash is stored on a self-winding reel on the cane and feeds from the lower end thereof.

OBJECTS OF THE INVENTION

When strolling with a dog, it is frequently necessary to have the dog on a leash, at least part of the time, and it is desirable to be able to vary the effective length of the leash. The leash is normally connected by a snap hook or the like to a loop fixed on the dog's collar. It is preferred that this connection be capable of being made and released quickly and with a minimum of effort.

The present invention aims to provide an improved assembly by which a dog may be kept under leash with better control and with greater flexibility as to choice of distance of the dog from his master while being walked.

Another object is to provide an improved leash device providing a variable length of leash and automatic payout and take-up of the leash as the dog varies his distance from his master.

A further object is to provide a leash assembly which can be easily applied and disconnected from the ring on a dog collar without need of manually gripping the collar, ring, or hook engaging the ring.

An additional aim of the invention is to provide a leash assembly giving the safety of a cane, if need be, and permitting the cane to be used as a walking stick when the leash is not being used.

SUMMARY OF THE INVENTION

A cane with a hollow staff open at its lower end and formed with a bottom seat has a self-winding reel on which a leash is wound and feeds down through the staff to a snap hook in the seat. When the hook is seated its keeper is forced into open position so that the hook can be easily engaged with a dog collar. Braking means are provided on the reel for limiting the extension of the leash and may take the form of a brake band controlled by a pull ring on the handle of the cane.

As used in the description of the present invention and accompanying claims, "cane" is used in the broad sense to include walking sticks with straight or curved handles.

DETAILED DESCRIPTION OF THE PREFERRED EMBODIMENTS

Figure 1:
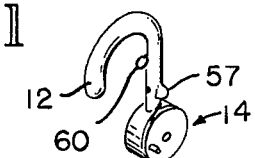
FIG. 1 is a perspective view of a cane assembly embodying the present invention and shown with the leash partly extended.
Figure 2:
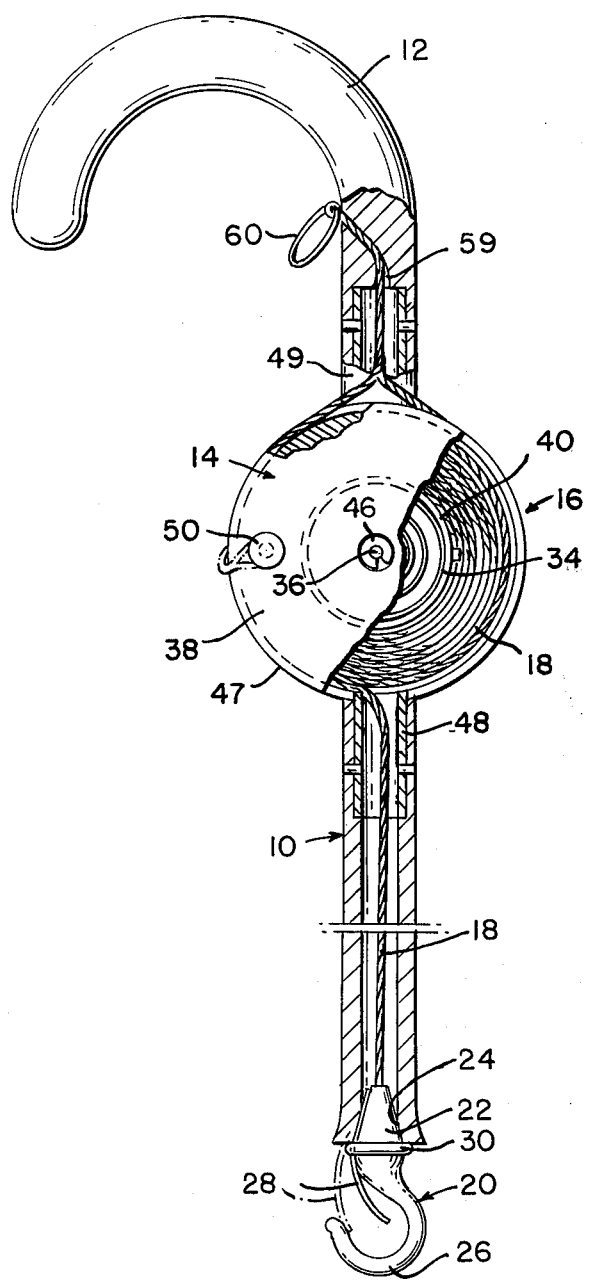
FIG. 2 is a detail side elevational view of the assembly, partly in vertical section.
Figure 3:
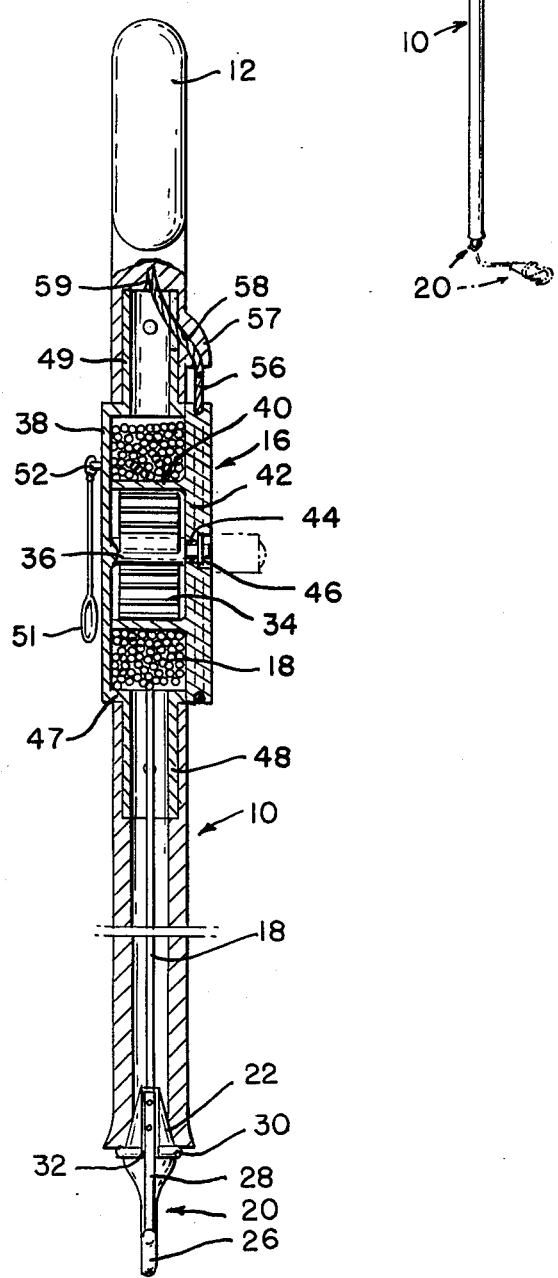
FIG. 3 is a detail front elevational view, also partly in vertical section.

Referring to the drawings, it is seen that in the illustrated embodiment a hollow staff section 10 and handle section 12, comprising a cane, are joined at a housing 14 for a reel assembly 16 on which a leash 18 is wound. The leash may comprise a strong, braided, synthetic fiber cord or cable and feeds out from the lower end of the staff. At its free end, the leash is connected to a snap hook 20 adapted to fit onto a ring on a dog collar. When the leash is fully retracted, the hook 20 has its shank 22 lodged in the bore 24 of the staff with the curved bill portion 26 of the hook exposed as shown in FIGS. 2–3 to then serve as the ground-engaging portion of the staff 10.

It will be noted that the snap hook 20 has its keeper 28 in the form of a leaf spring fixed at one end to the shank 22 and arranged to normally bear against the inside face of the tip portion of the bill 26 when the hook is free of the staff. Of importance is the fact that when the leash is fully retracted, the keeper 28 is forced by the lower end portion of the staff bore into an open position so that the hook can more easily be engaged with a dog collar ring. In order that the shank of the hook will seat easily and in proper axial alignment in the staff, it is preferred to have the bottom of the staff slightly flared and the hook shank 22 generally formed in a teardrop to provide a tapered portion conforming to the staff flare. It is also preferred to provide an annular flange portion 30 for seating against the end of the staff. As best seen in FIG. 3 this flange portion and the tapered shank 22 have a slot 32 to receive the keeper 28. With the described arrangement, the hook 20 serves as a firm ground-engaging end for the cane when it is being used solely as a walking stick.

The reel assembly 16 is preferably a self-winding unit so that as a dog on the leash varies his distance from the cane, there will normally not be any slack in the leash. Various self-winding mechanisms can be used. For the purpose of example, there is illustrated a spring motor within the center of the reel. This motor comprises a coiled clock spring 34 having its inner end connected to a stationary shaft 36 projecting from a side plate 38 and having its outer end connected to a spool 40 on which the leash is wound. In turn, the spool 40 projects from a cheek plate 42 which is journaled by a bearing 44 of the free end portion of the shaft 36. A snap ring 46 holds the assembly together.

The spring 34 is coiled tight, responsive to unwinding of the leash from the spool. When slack then appears in the leash, the spring 34 uncoils by turning the spool 40 and thereby causes the slack in the leash to be retrieved by the reel assembly. The spool 40 is enclosed circumferentially by a lateral ring extension 47 of the side plate 38 which has a bottom discharge boss 48 fitting into the upper end of the staff section 10. At its upper end, the ring 47 has a second boss 49 fitting into the lower straight portion of the handle section 12.

The cheek plate 42 of the reel may be provided with a side handle 50 for operating independently of the spring 34. A keeper loop 51, anchored at 52 to the side plate 38 or some other convenient location, may be looped over the reel handle 50, as shown in phantom in FIG. 2, to prevent rotation of the spool 40 as when it is desired to keep the hook shank 22 seated in the lower end of the staff or to limit payout of the leash at a distance less than the capacity of the reel.

In the latter regard, the reel assembly can also be provided with a braking assembly which can be conveniently manually controlled at the handle of the cane. For example, the cheek plate 42 of the reel may be circumferentially grooved to serve as a brake drum and receive a flexible brake band loop 56 which has its free portions wound together and threaded through a passage 58 formed in a side extension 57 and through a passage 59 in the handle 12 to make connection with a finger ring 60. It will be apparent that when this ring 60 is manually pulled, the brake band 56 will tighten around a major part of the circumference of the drum portion of the cheek plate 38 and prevent further rotation of the reel. Hence, with this arrangement, the desired amount of payout of the leash by the dog can be readily controlled at all times.

It is to be understood that other braking arrangements are within the scope of this invention, as, for example, a ratchet and pawl in place of the brake drum and band 56. Also, other self-winding mechanisms for the leash can be used, as, for example, a tension spring acting on a system of pulleys, all housed in the hollow handle and staff sections and arranged to provide a payout length advantage for the leash for a given stretching of the spring. It is also to be understood that the illustrated reel assembly can be at other locations along the staff or handle portions of the cane. The foregoing and other changes and modifications within the general teaching of the invention will be apparent to those skilled in the art and are intended to be within the scope of the annexed claims.

It is believed that the manner of operation of the invention is clear from the foregoing description. When it is desired to attach the leash, the leash is fully retracted so that the keeper 28 on the hook 20 will be in open position, making it easier to fit the hook within a ring on the dog collar. With a well-trained dog, the hook can thus be connected merely by manipulation of the cane and without bending over. The dog can then roam within the length of the leash on that portion thereof selected by the owner. Any slack appearing in the leash is automatically taken up. If a location is reached where the dog can run free, the leash is easily uncoupled merely by winding it up all the way so that the hook keeper 28 is opened. Then the cane can be used as a walking stick.

The embodiments of the invention in which a particular property or privilege is claimed are defined as follows:

1. In combination,
   a cane having a hollow staff with a socket open to the bottom,
   a reel mounted on the cane,
   a leash wound on the reel means and extending by its lower end downwardly therefrom through said hollow staff and socket,
   hook means connected to the lower end of said leash and having a bill and a shank, said shank being adapted to firmly seat in said socket with said bill outside when the leash is in a fully takeup position whereby the bill then becomes the ground-engaging part of the cane.

2. A combination according to claim 1 in which said reel has a housing with a discharge boss through which the leash passes from the reel, said staff being hollow beneath said housing and interfitting with said boss.

3. A combination according to claim 1 in which braking means are operatively associated with said reel for limiting turning of the reel and there is manual control means for operating said braking means.

4. In combination:
   a cane
   a leash carried by the cane, hook means on one end of the leash for connecting the leash to a ring on a dog collar, and
   a reel mounted on the cane and connected to the other end of the leash for paying out and taking up the leash relative to the cane, said reel having a handle for manually turning the reel and a stop loop arranged to be looped over said handle to prevent turning of the reel.

5. In combination:
   a self-winding reel assembly having a leash wound thereon,
   a hollow staff section mounted on said assembly and having said leash fed therethrough, and
   a hook on the free end of the leash having a shank adapted to slide into the lower end of the staff section and having a hooked bill portion arranged to become the ground-engaging part of the staff section when the shank is lodged in the staff, and
   a keeper connected to said shank and arranged to engage the bill to normally close the hook, said keeper being arranged to be retracted from the bill by the staff section when the hook shank slides into the lower end of the staff section so that the bill is free to fit into a ring on a dog collar.

6. A combination according to claim 5 in which there is a handle section mounted on the reel assembly above the staff section so that the handle and staff sections form a cane with the reel assembly.

7. A combination according to claim 6 in which means are mounted on the reel assembly for selectively stopping further payout of the leash, said control means on said handle section for manually operating said stopping means.

* * * * *